Nov. 9, 1926.  
W. A. ROWE  
1,606,387  
EXTENSION FRAME FOR MOTOR TRUCKS  
Filed June 25, 1924    3 Sheets-Sheet 1
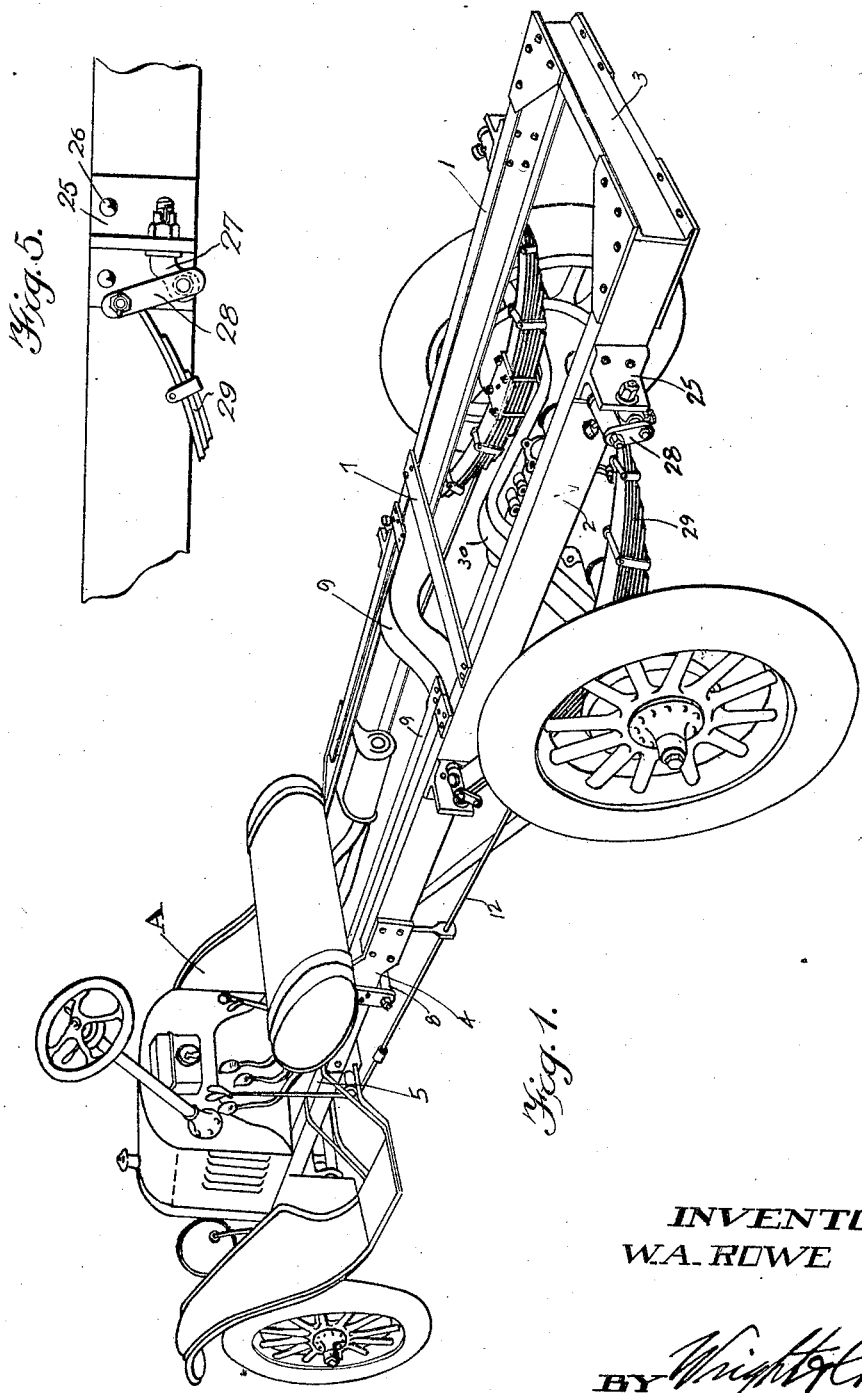
INVENTOR  
W.A. ROWE  
BY *Wright & Chinn*  
ATTYS Nov. 9, 1926.
W. A. ROWE
1,606,387
EXTENSION FRAME FOR MOTOR TRUCKS
Filed June 25, 1924    3 Sheets-Sheet 2
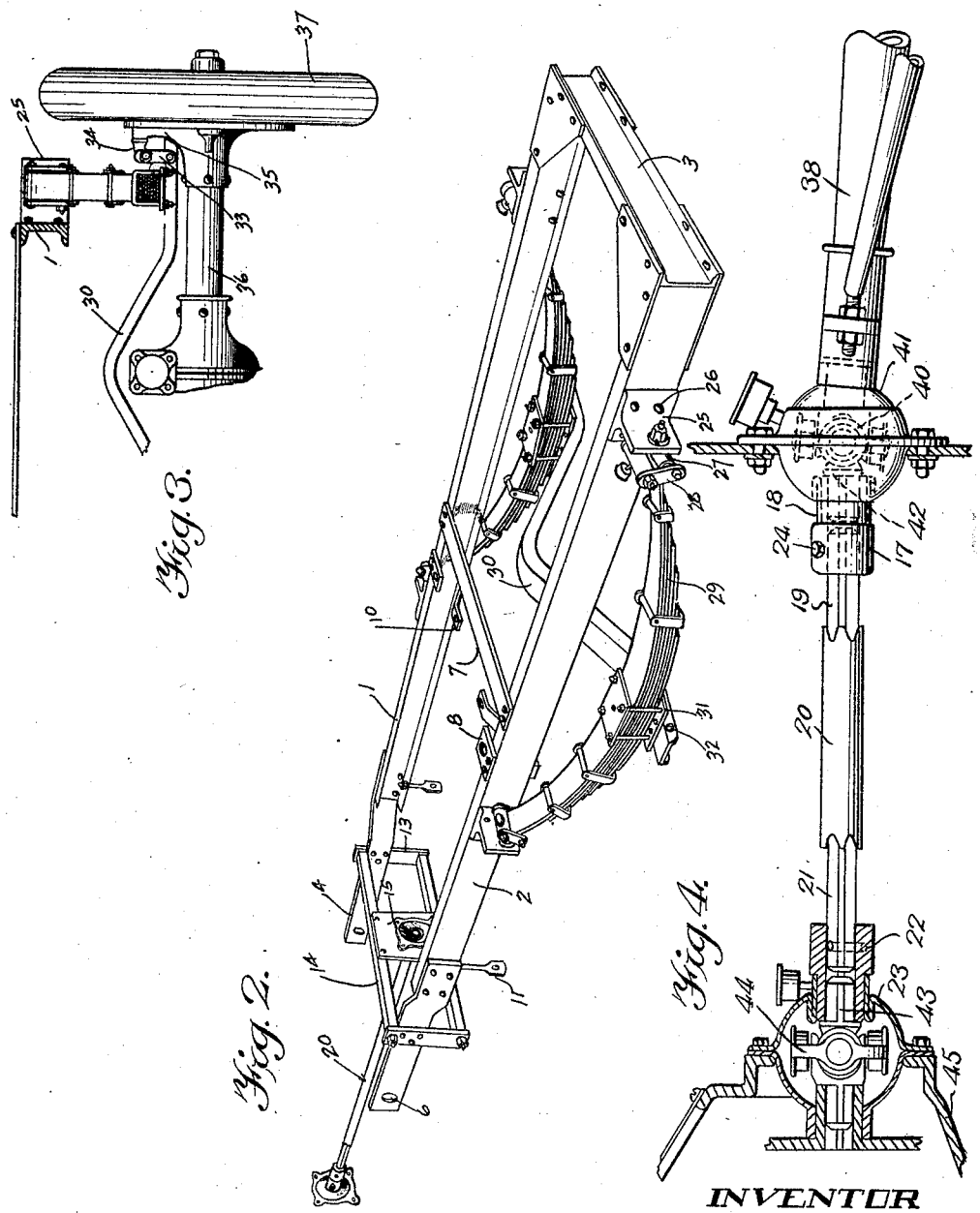
INVENTOR
W. A. ROWE
BY *Wright & Chunn*
ATTYS Nov. 9, 1926.
W. A. ROWE
1,606,387
EXTENSION FRAME FOR MOTOR TRUCKS
Filed June 25, 1924     3 Sheets-Sheet 3
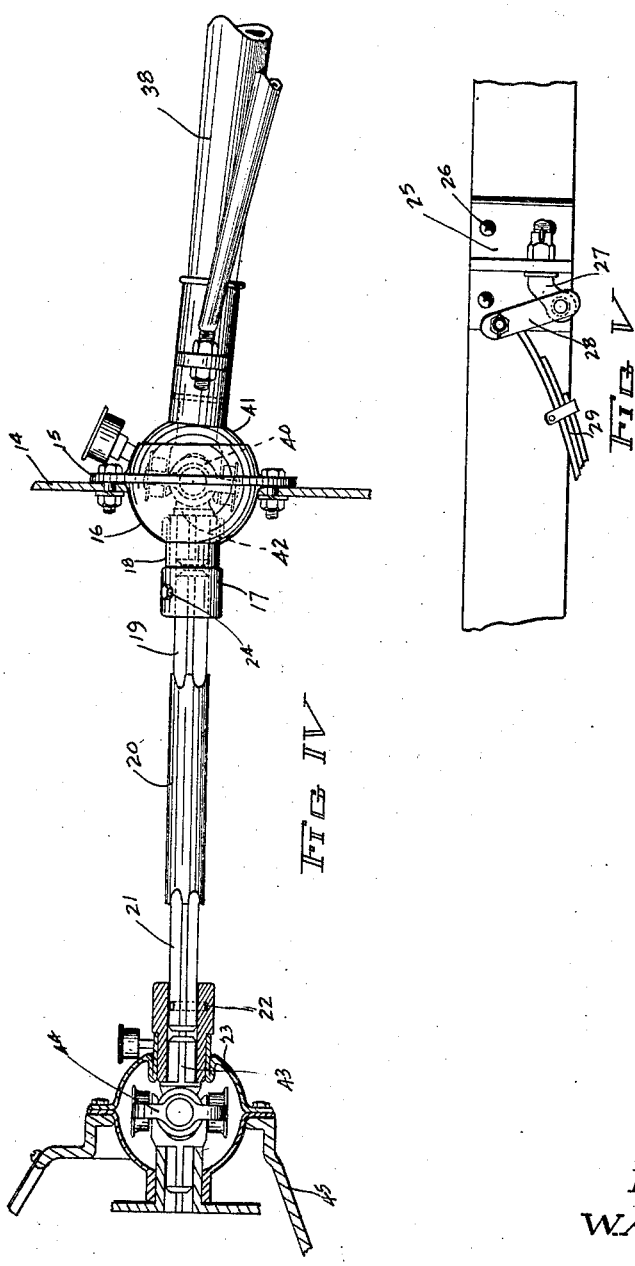
INVENTOR
W.A. ROWE
BY *Wright & Chunn*
ATTYS Patented Nov. 9, 1926.

1,606,387

UNITED STATES PATENT OFFICE.

WALTER A. ROWE, OF SAN FRANCISCO, CALIFORNIA.

EXTENSION FRAME FOR MOTOR TRUCKS.

Application filed June 25, 1924. Serial No. 722,333.

This invention resides in the provision of an enlarging attachment for a certain type of motor trucks, by means of which attachment a light, small truck may be easily and cheaply converted into a larger, stronger, more durable and heavier truck adapted for carrying greater and heavier loads.

An object of the invention is to provide an enlarging structure of the character described which is made up as a unit subject to immediate attachment to a motor truck upon taking down of the "rear end" of the motor truck, the "rear end" being then incorporated in the attachment structure.

An object is to provide a structure of the character described which is simple as to construction, inexpensive and made up largely of standard parts which are employed in the construction of the motor truck of the type to which the attachment is applicable, there being a novel method of mounting or hanging springs forming a part of the attachment and a specially constructed and arranged stress bar to which the "rear end" is adapted to be attached, said stress bar maintaining the wheels of the "rear end" in alignment and acting as a brace or reinforcing element for the "rear end."

A further object of the invention is to provide a novel means of extending the propeller or drive shaft of the ordinary truck which means includes a removable and adjustable jack shaft arranged so that the engine or the "rear end", either of them, may be taken down one without disturbing the other.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a perspective view of a motor truck with the extension structure of my invention attached thereto.

Fig. 2 represents a perspective view of the attachment as when removed from the truck.

Fig. 3 represents a fragmentary elevation of the attachment showing a part of the "rear end" attached thereto and being in part in cross section.

Fig. 4 represents an enlarged side elevation partly in section of the adjustable removable jack shaft and its associated parts.

Fig. 5 represents an enlarged fragmentary side elevation of one of the hangers for the springs.

In carrying out the invention I provide a rectangular frame made up of channel iron side bars 1 and 2 and joined at their rear ends by a similar bar 3. Extending from the forward ends of the bars 1 and 2 are attaching plates 4 having inwardly offset outer ends. These plates are adapted to be bolted to the side bars of the frame 5 of a motor truck as shown at A, there being bolt holes 6 in said plates adapted to engage the frame 5 at points intermediate the ends of the latter. The length of the body of the truck may be varied dependent on the point of attaching said plates 4. Extending across the tops of and attached to the bars 1 and 2 between the ends of the latter, is a brace 7. Located near this brace on the bars 1 and 2 are inwardly extending plates 8 adapted to engage the rear frame member 9 of the motor truck and to be bolted to said member. These plates are bolted onto the bars 1 and 2 and may be shifted depending on the point of attaching the extension frame to the truck frame. On the under sides of the bars 1 and 2 just in advance of the plates 8, are upwardly and inwardly extending brackets 10 which are adapted to engage the under side of the frame piece 9 and to be bolted thereto. Depending from the frame members 1 and 2 are apertured guides 11 for the brake rods 12.

The plates 4 support a rectangular frame composed of upright pieces 13 bolted to the plates and upper and lower cross pieces 14 fastened at their ends to the ends of the pieces 13. This frame acts as a reinforcing and bracing element for the extension frame and carries a plate 15 which supports a part 16 of a universal joint globe or casing. Extending from the part 16 is an adjustable sleeve 17 slidably supported in a tubular bearing extension 18 of said part 16. This sleeve is provided with a squared bore adapted to receive the squared end 19 of a jack shaft 20. The other end of the jack shaft is likewise squared as at 21 and is adapted to be mounted in a sleeve 22 corresponding to the one 17 and mounted in a part 23 of a universal joint globe or casing. These sleeves are adjustable longitudinally on squared portions of the jack shaft and are held in place by screws 24, the squared portions being of such lengths as to permit of the adjustment of the sleeves sufficient to permit removal of the shaft.

As a means for mounting the springs and "rear end" I provide T-shaped brackets 25 bolted as at 26 to the side pieces 1 and 2, which brackets support standard spring perches 27 employed as standard parts of the motor truck of the type to which this invention is applicable. To the ends of the perches are pivoted shackles 28 which are in turn pivoted to the ends of semi-elliptic springs 29 extending lengthwise of the frame. The bracket 25 may be readily provided by cutting sections off of the T or I beams into the proper sizes and the perches and shackles being of standard construction are subject to ready assemblage as shown particularly in Fig. 2. Extending transversely beneath the extension frame is an inverted V-shaped stress bar 30, end portions of which bar are rigidly secured as at 31 to the central portions of the springs. The terminals of the bar project beyond the sides of the springs and are provided with apertures 32, which apertures provide for pivotally connecting shackles 33 which depend from spring perches 34 mounted on the usual spiders or upstanding portions 35 of the rear axle 36. The ends of the bar abut the upright portions of the spider and act as a brace for the rear axle, particularly the wheels 37. This rigid stress bar having its ends engaged with the rigid upright portions of the rear axle prevent the wheels from being spread apart or "toed in" under heavy loads and strains. Thus, this bar acts as a brace and reinforcing element as well as an effective spring mounting. The enlarging attachment of the invention is shown as a complete unit in Fig. 2 as when constructed for immediate incorporation with a motor truck to be enlarged.

To provide for the attachment of the apparatus of this invention, it is first necessary to remove the rear axle 36 and its associated parts including the drive shaft 38 with its associated parts and to remove the rear springs, not shown. On removal of the "rear end" the extension frame is bolted onto the truck frame as shown in Fig. 1, the attaching plates 4 being fastened to the sides of the truck frame between the ends of the latter. The plates 8 and 10 are also bolted onto the terminal portions of the cross piece 9 of the main frame. thus establishing a rigid connection between the extension and main frames. It will be noted that by varying the point of connection of the plates 4 with the main frame, the length of the enlarged truck frame may be changed as desired. The plates 8 are bolted to the outer sides of the end piece 9, whereas the plates 7 are bolted to the inner sides of said piece. The "rear end" thus removed is then attached to the stress bar 30 through the medium of the shackles 33 and perches 34, the ends of the bar 30 engaging the upright portions or spiders 35 beneath the points where the perches 34 are supported by the spiders. The propeller or drive shaft generally indicated at 38 is connected with one side of a universal joint 40, which joint is a duplicate of the one employed in the type of motor truck to which the invention is applicable. This universal joint is housed in the part 16 of the globe or casing for the joint and the other part 41 of said globe or casing is attached to the plate 15 in the customary manner to establish the connection of the shaft 38 with the universal joint structure. The other side of the universal joint comprising a short squared shaft 42 is engaged in the squared end of the jack shaft 20. sleeve 22 is moved from the globe 23 entirely onto the squared portion 21 of the jack shaft so that said shaft may be brought into alignment with the shaft 43 of the universal joint 44 provided at the base 45 of the engine, not shown. Following this aligning of the shaft, the sleeve is moved back into position shown in the drawing so as to establish the connection, after which the screws 24 of the sleeves are turned into place to hold the joints assembled. The universal joint 44 is connected in the customary manner with the crank shaft of the engine and the drive connection between the "rear end" and the engine is thus established through the jack shaft and special mountings therefor. It will be seen that on moving the sleeves 17 and 22 entirely into the squared ends 19 and 21 of the jack shaft, the shaft may be dropped out of place and provision made for taking down the engine without disturbing or requiring the taking down of the "rear end" and vice versa. This adjustable take down jack shaft I consider one of the most important features of the invention as it makes possible a rapid and time saving connection of the motor with the "rear end" and the taking down of either in less time and with less work than has heretofore been possible.

With reference to the foregoing description and accompanying drawings, it will be seen that I have provided a structure of simple and inexpensive arrangement which may be easily and without appreciable expense incorporated with a small, light motor truck to convert said truck into a heavier truck having greater load capacity.

I claim:

1. A motor vehicle comprising a frame, front and rear wheels supporting the frame, springs attached to the frame, a rear axle having rigid upwardly extending portions adjacent to the rear wheels, and a bar extending above the axle across the frame to which bar said springs are attached and shackles connecting said bar with the upwardly extending portions of the axle.

2. A motor vehicle comprising a frame, front and rear wheels supporting the frame, springs attached to the frame, a rear axle having rigid upwardly extending portions adjacent to the rear wheels, a bar extending above the axle across the frame to which bar said springs are attached and shackles connecting said bar with the upwardly extending portions of the axle, the ends of said bar being engaged with said upwardly extending portions.

3. A vehicle comprising a frame, front and rear wheels, axles supporting said wheels, springs attached to the frame, a stress bar to which said springs are connected, which bar extends transversely of the frame beneath the latter, upwardly extending portions rigidly connected with the rear axle adjacent to the rear wheels and shackles pivotally connected with said portions and with said bar, the ends of said bar engaging the upwardly extending portions.

4. A vehicle comprising a frame, front and rear wheels, axles supporting said wheels, springs attached to the frame, a stress bar to which said springs are connected, which bar extends transversely of the frame beneath the latter, upwardly extending portions rigidly connected with the rear axle adjacent to the rear wheels and shackles pivotally connected with said portions and with said bar, the ends of said bar engaging the upwardly extending portions, said bar having an upward bend intermediate of its ends.

5. A vehicle comprising a frame, front and rear axles, front and rear wheels supported by the axles, springs connected at their ends with the frame, a bar extending transversely of and beneath the frame to which said bar said springs are rigidly attached intermediate of their ends, upright members rigidly connected with the rear axle adjacent to the rear wheels, shackles pivotally connected with and depending from said upright members, to which shackles the end portions of said bar are pivoted, said bar having its ends engaged with portions of the axle adjacent to the rear wheels.

6. A vehicle of the character described including in its construction a vehicle frame, a rear axle, rear wheels mounted on the rear axle, upwardly extending portions rigidly connected with said axle, a rigid bar extending above the axle between and in engagement at its ends with the upwardly extending portions, and springs connected with said bar intermediate the ends of the latter and with said frame.

WALTER A. ROWE.